Feb. 13, 1962            N. L. STARCK            3,021,429
SAFEGUARD DEVICE FOR AUTOMOTIVE ELECTRICAL SYSTEMS
Original Filed Dec. 4, 1953
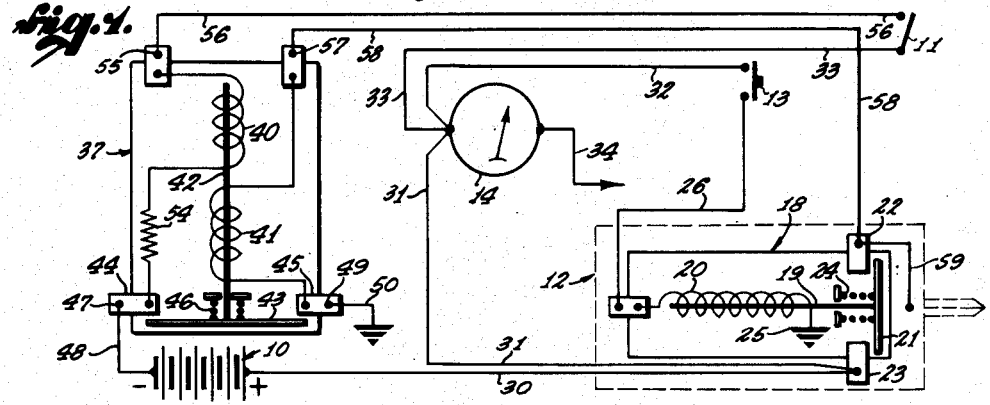
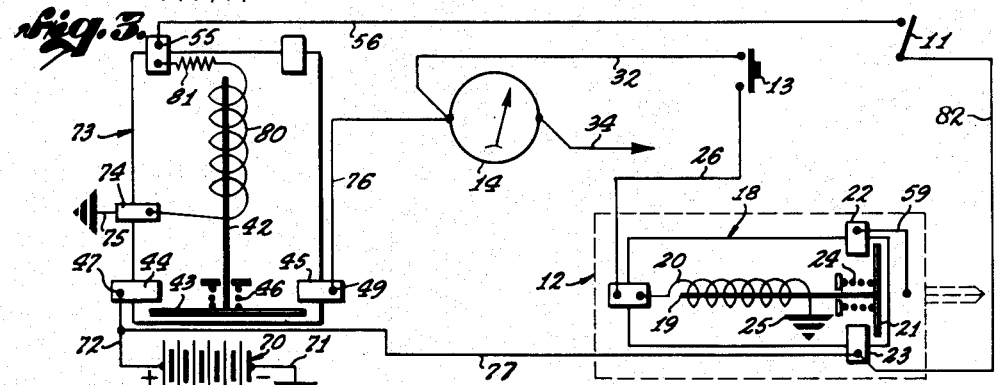
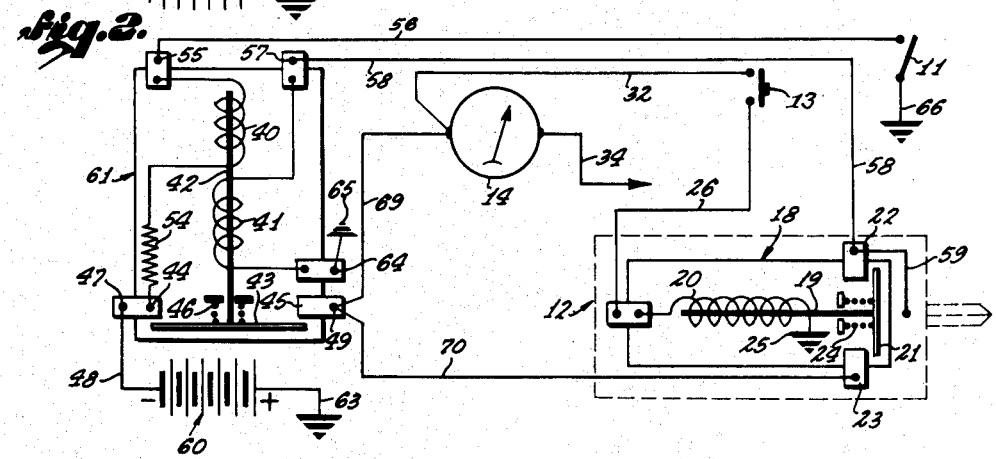
NOEL L. STARCK,
INVENTOR.
BY George J. Smyth
ATTORNEY.

United States Patent Office 3,021,429
Patented Feb. 13, 1962

3,021,429
SAFEGUARD DEVICE FOR AUTOMOTIVE ELECTRICAL SYSTEMS
Noel L. Starck, 6526 West Blvd., Los Angeles, Calif.
Substituted for abandoned application Ser. No. 396,239, Dec. 4, 1953. This application Dec. 28, 1960, Ser. No. 85,441
7 Claims. (Cl. 307—10)

This invention relates to an electrical circuit for an internal combustion engine and is directed to a circuit incorporating a safeguard against short circuits and against any heavy current flow whatsoever when the engine is not in operation. The present disclosure is directed by way of example to such a safeguard for an automotive vehicle and the like.

This present application is a duplicate of the parent application 396,239, which recovers verbatim the seven claims that were filed December 4, 1953, and allowed July 25, 1956, entitled Safeguard Device for Automotive Electrical Systems, that were abandoned under the Law (35 U.S.C. 151) and which Patent 2,904,702 is a division thereof.

One advantage of such an arrangement is, of course, the elimination of fire hazard, and especially when the vehicle is parked and unattended. A second advantage is the prevention of damage to the components of the wiring system that may arise from short circuiting or overloading. A third advantage is conservation of the battery itself as well as safeguard against running down the battery.

A fourth advantage is that the invention discourages car theft especially when the invention is installed on an automobile having a locked hood. A car thief cannot use a jumper wire to shunt the ignition key at the dash because all of the circuitry at the dash is de-energized. Such a jumper wire can be installed successfully only if access is gained to the present invention which is installed under the hood of the car.

In general these advantages are provided by an electrical automotive circuit in which at least one side of the battery is completely isolated or disconnected when the ignition switch is open and in which current flow through the circuit under direct control of the ignition switch is held to a minimum. Thus, when the key for the ignition switch is withdrawn, no circuits whatsoever can be closed through the storage battery of the vehicle and when the ignition key is inserted to close the ignition switch, the result is merely relatively light current flow through a limited portion of the wiring system.

A feature of the preferred practice of the invention is the use of a battery-isolated relay having two coils to provide two different magnitudes of contact-closing force. One of these two coils of the relay is a main coil that is employed for normal energization of the electrical system by the storage battery. The other of the two coils is an auxiliary coil or supplemental coil which may be aptly termed a booster coil since it provides added contact-closing force. The sole function of the ignition switch of the automotive wiring circuit is to energize the main coil for a minimum level of current flow from the battery, the current being sufficient to close the relay with relatively light contact-to-contact pressure. Since the contacts of this relay in the one practice of the invention provide the only connection between one side of the battery and the rest of the wiring system, the contacts must, on occasion, carry peak load imposed on the storage battery by the engine starter. The starter switch is connected to the relay contacts and provision is made for energizing the second or booster coil of the relay in response to energization of the engine starter. Thus, the starter circuit cannot be closed unless the ignition switch is first closed and the booster coil is automatically energized to increase the contact-to-contact pressure of the relay whenever the demand arises for peak current flow through the engine starter circuit. In this way, one circuit arrangement of the present invention makes it possible to use a minimum level of current flow to connect the battery with the rest of the circuit and to hold the battery connection closed during normal operation of the engine. At the same time the circuit arrangement provides for additional flow of current to energize the relay when required to prevent overheating, burning and pitting of the relay contacts.

One practice of the invention is further characterized by the provision, as a new article of manufacture, of a simple unit that may be added to any automotive electrical system to convert the wiring system of the vehicle to the new mode of safety operation. A feature of the invention in this regard is that the accessory unit may be installed in a simple manner requiring no special technical skill or knowledge.

The various features and advantages of the invention will be apparent in the following detailed description considered with the accompanying drawing.

In the drawing, which is to be regarded as merely illustrative:

FIGURE 1 is a schematic wiring diagram embodying one form of the invention;

FIGURE 2 is a similar diagram of a second form of the invention; and

FIGURE 3 is a similar diagram of a third form of the invention.

FIGURE 1 shows some of the essential components of a conventional automotive electrical system including a storage battery 10, an ignition switch 11, an engine starter indicated by the broken line rectangle 12, a starter switch 13 and an ammeter 14.

The engine starter 12 includes the usual starter relay, represented by the inner solid line rectangle 18, which is of conventional construction. The starter relay 18 has the usual armature 19 controlled by a relay coil 20 and the armature carries the usual movable contact 21 which is adapted to bridge or interconnect a pair of stationary contacts 22 and 23. Normally, the movable contact 21 is held in open position by a suitable spring 24; whenever the relay coil 20 is energized, however, the armature 19 is attracted by the coil to move the contact 21 into closed position bridging the two stationary contacts 22 and 23. One side of the relay coil 20 is grounded as indicated in 25 and the other side is connected by a wire 26 to one side of the starter switch 13.

The positive side of the battery 10 is connected by a wire 30 with the stationary contact 23 of the starter relay 18 and this stationary contact is connected by a wire 31 to one side of the ammeter 14. The same side of the ammeter 14 is connected by a wire 32 to the second side of the starter switch 13 and is connected by a wire 33 with one side of the ignition switch 11. The other side of the ammeter 14 has at least one wire 34 connected thereto in the usual manner to serve as an accessory power supply conductor for energizing various components including the components of the lighting system of the automobile. Among the components energized by the power supply conductor 34 are the spark plugs of the engine. The ignition circuit which energizes said spark plugs is connected directly to wire 34, and therefore its effective energization is controlled by the contacts 43, 44, 45, which are closed by the energization of the main relay coil 40 (FIGURES 1 and 2) or of the relay coil 80 (FIGURE 3) by the ignition switch 11, as will be hereinafter more fully described.

All of the above described components are conventional in an automotive electrical system and, of course, a typical automotive wiring circuit includes additional components which need not be described for the purpose of the present disclosure.

While the principles of the invention may be incorporated in an automotive wiring system in various ways in various practices of the invention, preferably the necessary components for converting a conventional wiring system into the new safety system are provided by a single unit having a housing or casing represented by the solid line rectangle 37. As will be apparent such a unit may be manufactured and sold as an accessory device to be installed in a conventional automotive wiring system.

The housing 37 of the new unit encloses a main relay coil 40, an auxiliary booster relay coil 41 and a relay armature 42 that is common to and responsive to both of these coils. The armature 42 carries a movable contact 43 to bridge or interconnect a pair of stationary contacts 44 and 45. A suitable spring 46 urges the movable contact 43 to the open position shown in FIGURE 1 and energization of either of the two coils 40 and 41 moves the contact 43 to closed position in opposition to the spring 46.

The stationary contact 44 is integral with a terminal 47 on the exterior of the unit casing 37 for connection with the negative side of the battery 10 by a wire 48. In like manner, the stationary contact 45 inside the unit is integral with an exterior terminal 49 for connection by a wire 50 to ground as indicated in the drawing.

One end of the main relay coil 40 of the unit is connected to the stationary contact 44, preferably through a suitable resistor 54 that limits the amount of current flow through the coil but nevertheless permits sufficient current flow to overcome the resistance of the spring 46. The other side of the main relay coil 40 is connected to an external terminal 55 of the unit for connection by a wire 56 to the second side of the ignition switch 11. One side of the booster relay coil 41 is connected to the stationary contact 45 and the other side is connected to an external terminal 57 of the unit for connection by a wire 58 with the stationary contact 22 of the starter relay 18. This stationary contact 22 of the starter relay is connected in the usual manner to the starter motor by a wire 59, the other side of the starter motor being grounded to complete the starter circuit.

When the ignition switch 11 is closed, the following circuit is completed to energize the main relay coil 40; the positive side of the battery 10; wire 30; wire 31; wire 33, ignition switch 11; wire 56; terminal 55 of the safety unit; coil 40; resistor 54; terminal 47 on the exterior of the unit; and wire 48 to the negative side of the battery.

Energization of the main relay coil 40 by closing of the ignition switch 11 actuates the armature 42 to make it possible for the starter switch 13 to energize the starter relay 18. When the starter switch 13 is then closed while the ignition switch 11 is closed, the following circuit is completed through the coil 20 of the starter relay 18: the positive side of the battery 10; wire 30; wire 31; wire 32; starter switch 13; wire 26; starter relay coil 20; ground 25; wire 50 from ground to the external terminal 49 of the unit; contact 45 inside the unit; movable contact 43; contact 44; external terminal 47; and wire 48 to the negative side of the battery.

The closing of the movable contact 21 against the two stationary contacts 22 and 23 resulting from energization of the coil 20 of the starter relay 18 completes the following circuit for energization of the booster relay coil 41 in the unit casing 37; positive side of the battery 10; wire 30, stationary contact 23 in the starter relay 18; movable contact 21; stationary contact 22; wire 58; terminal 57 of the unit; booster relay coil 41; contact 45; movable contact 43; contact 44; external terminal 47; and wire 48 to the negative side of the battery.

From the foregoing, it is apparent that when the ignition switch 11 is open, the negative side of the battery 10 is isolated or disconnected to prevent any current flow whatsoever throughout the wiring system, and that when the ignition switch 11 is closed, only such relatively weak current will flow as will be necessary to energize the main relay coil 40 for holding the movable contact 43 lightly against the two stationary contacts 44 and 45 inside the unit. It is further apparent that when the starter switch 13 is closed to draw a peak load of current from the battery 10 for energizing the engine starter, the booster relay coil 41 will be automatically energized at the same time to increase the pressure of the movable contact 43 against the two stationary contacts 44 and 45 for more effective cooperation of the contacts to avoid overheating, burning and pitting of the contact surfaces.

It will be readily appreciated that it is a simple matter to install the new unit in a conventional automotive wiring system. In this instance, prior to installation of the unit, the negative side of the battery 10 is grounded and it is merely necessary to interpose the unit between the battery and ground. Thus, the unit casing 37 is mounted in a convenient location for connection of the unit terminal 47 to the battery and the unit terminal 49 to the ground. The other wires of the system are rearranged for the proper connection with the two unit terminals 55 and 57, the ignition switch being connected to one terminal and the starter switch being connected to the other.

The wiring diagram of the second embodiment of the invention shown in FIGURE 2 is largely identical with the wiring diagram shown in FIGURE 1, as indicated by the use of corresponding numerals to designate identical parts. In this instance, the unit, which has a casing 61, is installed in an automotive wiring system in which the storage battery 60 has its positive side grounded as indicated at 63, and the external terminal 47 of the unit is connected to the negative side of the battery by the wire 48. The particular embodiment of the unit employed in this arrangement has a fifth external terminal 64 which is grounded as indicated at 65 and the booster relay coil 41 is connected to this terminal as shown. In all other respects the unit of FIGURE 2 is the same as shown in FIGURE 1.

The terminal 55 of the unit is connected by the wire 56 to one side of the ignition switch 11, as before, but the second side of the ignition switch is connected to ground by a wire 66. The terminal 49 of the unit is connected by a wire 69 with the ammeter 14 and is connected by a wire 70 with the fixed contact 23 of the starter relay 18.

When the ignition switch 11 in FIGURE 2 is closed, it completes the following circuit to energize the main relay coil 40 of the unit; positive side of the battery 60, wire 63 to ground; ground to switch 11 through wire 66; wire 56, terminal 55 of the unit; coil 40; resistor 54; stationary contact 44; terminal 47; and wire 48 to the negative side of the battery. The resulting energization of the main coil 40 closes the movable contact 43 against the two stationary contacts of the unit and when the starter switch 13 is then closed, the following circuit is completed to energize the relay coil 20 in the starter relay 18; positive side of the battery 60 to ground through the wire 63; ground to the relay coil 20 of the starter; wire 26; starter switch 13; wire 32; wire 69; terminal 49; stationary contact 45; movable contact 43; stationary contact 44; terminal 47; and wire 48 to the negative side of the battery. The consequent closing of the starter relay 18 conpletes the following circuit for energizing the booster relay coil 41 in the unit; positive side of the battery 60 to ground through wire 63; ground to terminal 64 of the unit; booster relay coil 41; terminal 57; wire 58; stationary terminal 22 of the starter relay; movable contact 21; stationary contact 45; movable contact 43; stationary contact 44; terminal 47; and wire 48 to the negative side of the battery.

It is apparent in this second wiring arrangement the second form of the unit will operate in substantially the same manner and with the same sequence of steps as heretofore described.

The third form of the invention shown in FIGURE 3 is incorporated in a wiring system which has a battery 70 which is grounded on its negative side by a wire 71 and on its positive side is connected by a wire 72 with the external terminal 47 of the unit. Thus, the unit is interposed between the positive side of the battery and the rest of components of the automotive wiring system. The unit indicated in FIGURE 3 has a suitable casing 73 which is provided with an external terminal 74 connected to ground by a wire 75. In this instance, the unit has only one relay coil 80, one side of which is connected to the terminal 74 and the other side of which is connected through a resistor 81 to the external terminal 55 of the unit. In all other respects the arrangement shown in FIGURE 3 is similar to the previously described arrangements as indicated by the use of corresponding numerals to designate identical parts.

The unit terminal 55 is connected to one side of the ignition switch 11 by the usual wire 56 and the other side of the ignition switch is connected by a wire 82 to the fixed contact 23 of the starter relay 18. The external terminal 49 of the unit is connected to the ammeter 14 by a wire 76. A wire 77 connects the previously mentioned wire 72 on the positive side of the battery with the fixed terminal 23 of the starter relay 18.

When the ignition switch 11 is closed in the arrangement shown in FIGURE 3, the following circuit is completed for energization of the relay coil 80 in the unit; positive side of the battery 70; wire 72; wire 77; wire 82; ignition switch 11; wire 56; terminal 55; resistor 81; relay coil 80; terminal 74; wire 75 to ground; and wire 71 from ground to the negative side of the battery. With the relay coil 80 energized, closing the starter switch 13 completes the following circuit for energizing the coil 20 in the starter relay 18; positive side of battery 70; wire 72; terminal 47 of the unit; stationary contact 44; movable contact 43; stationary contact 45; terminal 49; wire 76; wire 32; starter switch 13; wire 26; relay coil 20; to ground; and wire 71 from ground to the negative side of the battery.

In this arrangement, the positive side of the battery 70 is effectively isolated from the remaining components of the wiring system as long as the ignition switch 11 is open. When the ignition switch is closed, current flows at a minor rate through the relay coil 80 to hold the movable contact 43 in closed position against the resistance of the spring 46. The peak load of current flows only when the starter switch 13 is closed but a feature of this arrangement is that it is not necessary to provide a booster relay coil in the unit for increasing the pressure of the movable contact 43 against the two stationary contacts 44 and 45 because the heavy current is by-passed around the unit by the wire 77.

My description in specific detail of selected specific embodiments of the invention will suggest to those skilled in the art various changes, substitutions, and other departures within the spirit and scope of the appended claims.

I claim:

1. In a battery disconnect circuit for an internal combustion engine, a battery having a pair of terminals, a pair of conductors for said terminals, a first relay having a pair of contacts connecting one of said terminals with one of said conductors, an engine ignition switch, a holding coil in said relay in circuit with said battery and said engine ignition switch for closing said relay, an engine starter relay, in series with said contacts of said first relay, and a second holding coil in said first relay, connected to be energized when current flows through the starter switch and said energizing coil of said engine starter relay.

2. In a battery disconnect circuit for an internal combustion engine, a battery having a pair of terminals, a pair of conductors for said terminals, a first relay having a pair of contacts connecting one of said terminals with one of said conductors, an engine ignition switch, a holding coil in said relay in circuit with said battery and said engine ignition switch for closing said relay, a second holding coil in said relay connected to be energized when current flows through said first relay contacts, and said energizing coil of said engine starter relay, and a starter switch for operating said engine starter relay, said starter relay being connected with said first relay whereby it is initially dependent upon said engine ignition switch and said first holding coil.

3. In a battery disconnect circuit for an internal combustion engine, a battery having a pair of terminals, a pair of conductors for said terminals, a first relay having a pair of contacts connecting one of said terminals with one of said conductors, an engine ignition switch, a holding coil in said relay in circuit with said battery and said engine ignition switch for closing said relay contacts, an engine starter relay, a second holding coil in said first relay connected to be energized when current flows through the first relay and said engine starter relay, and a starter switch for operating said engine starter relay, said starter relay being connected with said first relay whereby it is initially dependent upon said engine ignition switch and said first holding coil, said starter relay being in series with said second holding coil whereby they are both de-energized when said starter switch is open.

4. In a battery disconnect circuit for an internal combustion engine, a battery having a pair of terminals, a pair of conductors for said terminals, a first relay having a pair of contacts connecting one of said terminals with one of said conductors, an engine ignition switch, a holding coil in said relay in circuit with said battery and said engine ignition switch for closing said relay contacts, and an engine starter relay in series with said first relay, a starter switch for operating said engine starter relay, and a second holding coil in said first relay, said starter relay being in series with said second holding coil whereby they are both de-energized when said starter switch is open.

5. In an apparatus of the character described the combination of a battery having a pair of terminals, a first relay connected with one of said terminals, a grounded conductor connected with said relay, an engine ignition switch, a holding coil in said relay in circuit with said battery and said engine ignition switch for closing said relay, an engine starter relay in series with said first relay, a starter switch for operating said engine starter relay, and a second holding coil in said first relay, said starter relay being in series with said holding coil whereby they are both de-energized when said starter switch is open.

6. In an electrical circuit including a battery, an engine starter, an ignition switch and a starter switch, the combination therewith of: a normally open ignition relay having a first low amperage coil and a second booster coil; and a normally open starter relay in series with said ignition relay, battery and starter, said starter relay having a coil, said first coil of the ignition relay being in series with said battery and ignition switch, said booster coil being in parallel with said starter, said coil of the starter relay being in series with said starter switch, said coil of the starter relay and said starter switch being in parallel with said starter and starter relay, whereby closing the ignition switch closes said ignition relay to make the starter responsive to closing of the starter relay and then closing said starter switch closes the starter relay for energization of the starter and simultaneous energization of said booster coil to increase the contact pressure of said ignition relay.

7. A unit for installation into the electrical system of an internal combustion engine and the like, which system includes a source of electrical energy, an ignition switch, a starter switch, and a starter relay including an energizing coil and a pair of normally open contacts; said unit including in combination: a second relay having a pair of normally open contacts; means for connecting said normally open contacts of said second relay in series with the starter switch, the energizing coil of the starter relay and the source of electrical energy; a coil for said second relay; means for connecting said main coil in series with the source of electrical energy and the ignition switch to cause the normally open contacts of said second relay to be closed in response to the closure of the ignition switch; a booster coil for said second relay; and means for energizing said booster coil in response to the closure of the starter relay contacts to increase the contact pressure of said normally open contacts of said second relay when the starter relay is energized.

No references cited.